(12) United States Patent
Johnston

(10) Patent No.: US 9,085,345 B2
(45) Date of Patent: Jul. 21, 2015

(54) VESSEL WITH EXTENDIBLE RAMP

(71) Applicant: Daniel Johnston, Redington Beach, FL (US)

(72) Inventor: Daniel Johnston, Redington Beach, FL (US)

( * ) Notice: Subject to any disclaimer, the term of this patent is extended or adjusted under 35 U.S.C. 154(b) by 1 day.

(21) Appl. No.: 13/710,223

(22) Filed: Dec. 10, 2012

(65) Prior Publication Data

US 2014/0158038 A1    Jun. 12, 2014

(51) Int. Cl.
  *B65G 67/60*   (2006.01)
  *B63B 27/14*   (2006.01)
  *B63B 19/08*   (2006.01)

(52) U.S. Cl.
  CPC ......... *B63B 27/143* (2013.01); *B63B 2019/083* (2013.01)

(58) Field of Classification Search
  CPC  B63B 27/143; B63B 19/08; B63B 2019/083; B63B 2019/086; B63B 27/14; B63B 2027/141
  USPC ......... 114/362, 258–262; 14/71.3, 71.5, 71.1; 414/921, 139.4–139.9, 143.2, 143.3
  See application file for complete search history.

(56) References Cited

U.S. PATENT DOCUMENTS

| | | | | |
|---|---|---|---|---|
| 3,280,777 | A * | 10/1966 | Matzer | 114/70 |
| 6,058,866 | A * | 5/2000 | May | 114/85 |
| 6,223,669 | B1 * | 5/2001 | Bowden | 114/65 R |
| 7,137,350 | B2 * | 11/2006 | Waldock | 114/362 |
| 7,228,582 | B1 * | 6/2007 | Jones et al. | 14/71.1 |
| 7,451,512 | B2 * | 11/2008 | Fullerton et al. | 14/69.5 |
| 2003/0230227 | A1 * | 12/2003 | Wright | 114/343 |
| 2004/0107520 | A1 * | 6/2004 | van der Heiden | 14/71.1 |
| 2014/0113512 | A1 * | 4/2014 | Dick | 440/12.52 |

* cited by examiner

Primary Examiner — S. Joseph Morano
Assistant Examiner — Andrew Polay
(74) Attorney, Agent, or Firm — Lempia Summerfield Katz LLC

(57) ABSTRACT

A water vessel is provided. The water vessel includes a hull, a deck, and a ramp. The hull has a front end, an aft end, a starboard side, a port side, a bottom, a bow at the front end, and a stern at the aft end. The bow is movable between a closed configuration and an open configuration. The deck is in the region of the bow. The ramp is located between the bottom of the hull and the deck in a retracted position. When the bow is in the open configuration, the ramp is movable to an extended position in which the ramp extends from the front end of the hull.

17 Claims, 6 Drawing Sheets

VESSEL WITH EXTENDIBLE RAMP

BACKGROUND

The present embodiments relate to a water vessel or craft.

Boats may have a V-bottom shaped hull or a flat bottom shaped hull. Boats with flat bottom shaped hulls sit on or close to the top of the water, while boats with V-bottom shaped hulls sit further below the top of the water, or deeper in the water, than boats with flat bottom shaped hulls. Boats with V-bottom hulls may thus cut through waves better, such that these boats may be better equipped to handle heavy water (e.g., deeper water, choppier water) than boats with flat-bottom hulls. For the same reason, however, boats with V-bottom hulls may be less fuel efficient and slower than boats with flat bottom hulls because of increased water resistance stemming from the deeper seated hull.

Boats that provide speedy access to land and/or other boats and/or distressed people in the water may be used to conduct emergency operations (e.g., search, rescue, patrol, and/or firefighting operations). These boats may, for example, include a flat front (instead of a bow) and a flat bottom shaped hull so as to allow emergency personnel on the boat to quickly exit the boat and access land and/or other boats in the water. For example, landing craft with flat fronts and flat bottom shaped hulls were used during World War II to conduct amphibious assaults. These landing craft were not, however, usable in heavy water (i.e., not sea worthy) and were difficult to control/operate because of their flat front and flat bottom shaped hulls.

BRIEF SUMMARY

By way of introduction, the preferred embodiments described below include a vessel that may be used to conduct emergency operations (e.g., provides easy access to land) but is also operable in heavy water and is easy to control. The vessel has a hull with a reconfigurable bow, and a ramp that is extendible from a front portion of the hull when the bow has been reconfigured. In some embodiments, a portion of the ramp may be adjusted relative to another portion of the ramp.

In a first aspect, a water vessel is provided. The water vessel includes a hull, a deck, and a ramp. The hull has a front end, an aft end, a starboard side, a port side, a bottom, a curved bow at the front end, and a stern at the aft end. The curved bow is movable between a closed configuration and an open configuration. The deck is in the region of the curved bow. The ramp is located between the hull and the deck in a retracted position. When the curved bow is in the open configuration, the ramp is movable to an extended position in which the ramp extends from the front end of the hull.

In a second aspect, a water vessel is provided. The water vessel includes a hull, a planar deck, a ramp, and a motor. The hull has a front end, a rear end, a pair of sides between the front end and the rear end, a bottom, a bow at the front end, and a stern at the rear end. The bow is movable between a closed configuration and an open configuration. The planar deck extends between the bow and the stern. The ramp is located between the bottom of the hull and the planar deck in a retracted position. The motor is coupled to the ramp and is configured to drive the ramp to an extended position when the bow is in the open configuration. When the ramp is in the extended position, the ramp extends forward from the front end of the hull.

In a third aspect, a method of operating a water vessel is provided. The water vessel includes a hull with a front end, a rear end, a pair of sides between the front end and the rear end, a bottom, a curved bow at the front end. The method includes moving the curved bow from a closed configuration to an open configuration. The method includes moving, when the curved bow is in the open configuration, a ramp from a retracted position in which the ramp is located between the hull and a deck in the region of the curved bow to an extended position in which the ramp extends from the front end of the hull. The method also includes moving, when the curved bow is in the open configuration, the ramp from the extended position back to the retracted position. The method further includes moving, when the ramp is in the retracted position, the curved bow from the open configuration back to the open configuration.

The present invention is defined by the following claims, and nothing in this section should be taken as a limitation on those claims. Further aspects and advantages of the invention are discussed below in conjunction with the preferred embodiments.

BRIEF DESCRIPTION OF SEVERAL VIEWS OF THE DRAWINGS

The components of the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

The present embodiments generally relate to a vessel that may be used to conduct emergency operations (e.g., patrol, rescue, search, and/or firefighting operations), but is also operable in heavy water and is easy to control. Boats with flat bottom hulls and flat fronts are typically used for one or more of these types of operations. Unlike these known boats, which are not capable of handling heavy water and may be difficult to control, the disclosed embodiments provide a vessel with a curved (e.g., V-shaped) hull configured to handle any type of water (including shallow, calm, deep, and heavy water). At the same time, the disclosed embodiments provide a reconfigurable bow and an adjustable ramp that are operable with this hull to facilitate the performance of emergency operations (e.g., facilitate easy and speedy access to land and/or other boats and/or distressed people in the water.

The terms forward, rearward, front, rear, side, top, bottom, underside, and the like are used herein merely for reference and are not intended to limit in any way the specific position or particular orientation of any components of the vessel 100. Similarly, nautical terminology, such as port and starboard, is used herein merely for reference and is not intended to limit in any way the specific position or particular orientation of any components of the vessel 100.

Turning now to the drawings, FIGS. 1-5 illustrate various aspects of an exemplary vessel, craft, or boat 100. The vessel 100 is configured for use in any type of water, such as at sea, on a lake, on a river, or on an ocean. The vessel 100 is configured for use in or during emergency operations, such as patrol, search, firefighting, and/or law enforcement operations, but may be used for recreational purposes (e.g., on a yacht) or for other purposes as well.

Figure 2:
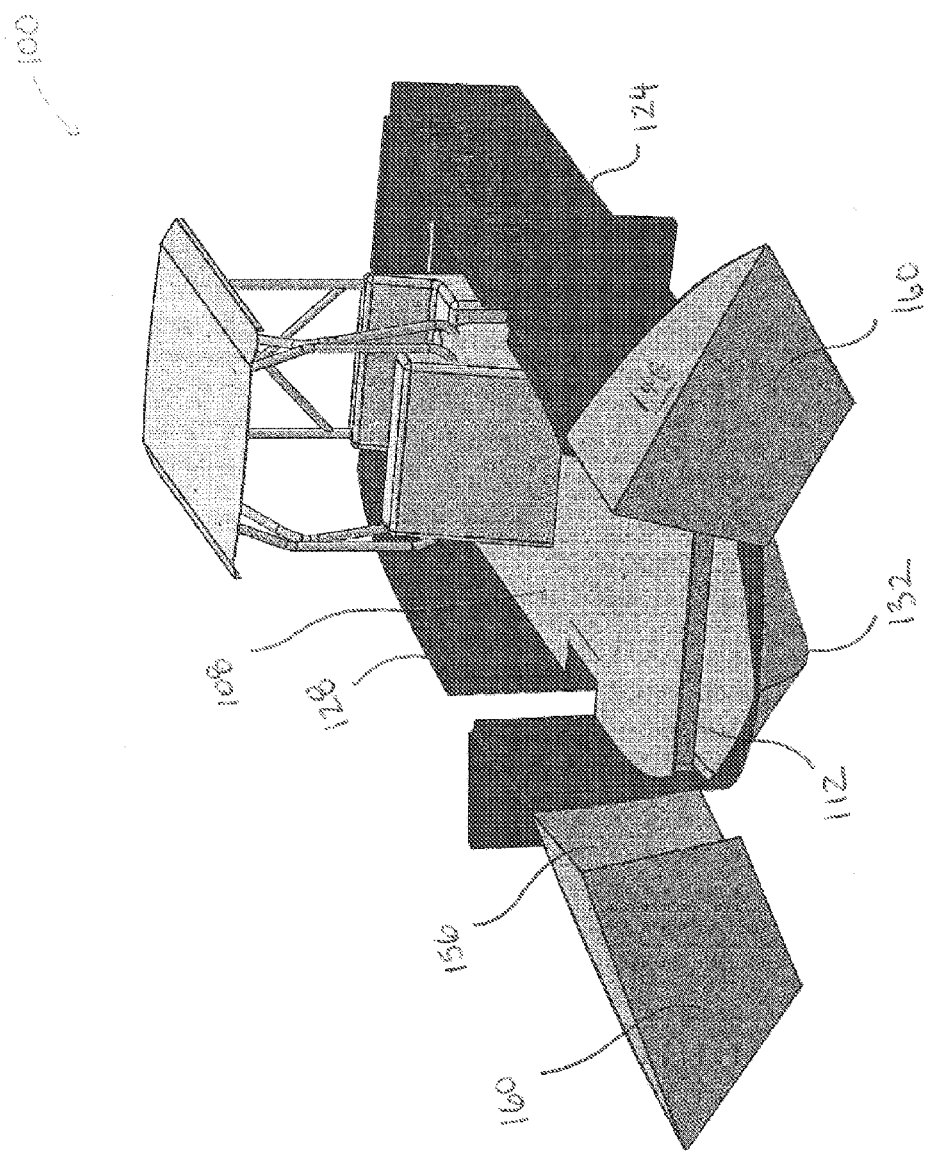
FIG. 2 is a perspective view of the vessel of FIG. 1 with a bow moved to an open configuration.

The vessel 100 generally includes a hull 104, a deck 108, a control station or cockpit 110, and an adjustable or extendible ramp arrangement or mechanism 112 (see FIG. 2). The vessel 100 is powered by a motor (not shown). The motor may be an electric motor, a gas motor, or may be run on any other energy source (e.g., natural gas, propane, diesel fuel, refined fuel, etc.). The motor may be of any size and may be positioned anywhere on the vessel 100 (e.g., at the bow, at the stern, under the deck, etc). The vessel 100 also includes a pair of dive doors 114 which may be used when conducting patrol, search, rescue, or firefighting operations, but one, more than two, or no doors 114 may be provided. Although not depicted herein, the vessel 100 may also include other patrol, search, rescue, and/or firefighting equipment, such as, for example, a fire pump (e.g., a 1200 GPM jet fire pump) and/or a fire monitor. In other embodiments, the vessel 100 may include additional, different, or fewer components. For example, the vessel 100 need not include the control station 110.

The hull 104 is a V-shaped or generally V-shaped (e.g., substantially or semi-V-shaped) hull. In other embodiments, the hull 104 may be a flat bottom, tri-hull, pontoon, or other shaped hull 104. The hull 104 is made or constructed from a military-grade aluminum (e.g., 5086-H116 Grade Aluminum), but may alternatively be made from another type of aluminum, steel, fiberglass, any other type of material, or combinations thereof. In the present embodiments, the hull 104 has a length of 26 feet, but in other embodiments, the hull may a different length (e.g., 20 feet, 24 feet, 28 feet, etc.).

Figure 1:
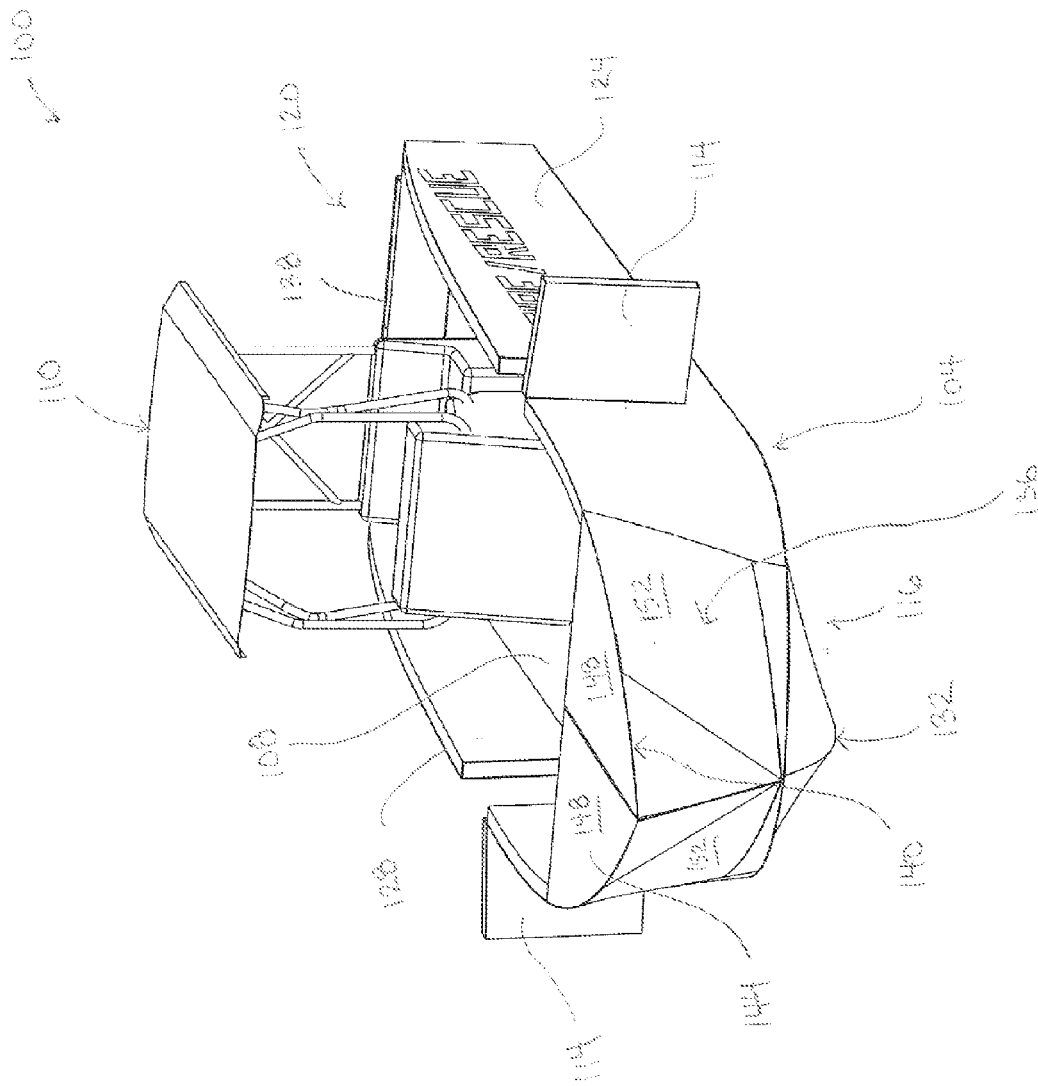
FIG. 1 is a perspective view of a vessel according to one embodiment.

As shown in FIG. 1, the hull 104 has a forward or front end or portion 116, an aft, rearward, or rear end or portion 120, a port side 124, a starboard side 128, and a bottom 132 for supporting the hull 104 on or in the water. The hull 104 further includes a bow 136 positioned or located at the front end 116 and a stern 138 positioned or located at the aft end 120. The bow 136 and the stern 138 generally extend upward from the bottom 132 of the hull 104 between the port side 124 and the starboard side 128, but may be arranged differently. In other embodiments, the hull 104 may include additional, different, or fewer components. For example, the hull 104 may have a different sized and/or shaped end 116, end 120, side 124, side 128, bottom 132, bow 136, stern 138, or combinations thereof, than those illustrated in FIG. 1.

In the present embodiments, the bow 136 is a curved split-bow. In other words, the bow 136 includes a first bow section or portion 140 and a second bow section or portion 144. Both the first and second bow sections 136, 140 are curved as shown in FIG. 1. The bow sections 140, 144 each have a generally triangular top face 148, a curved, but trapezoidally-shaped outer or front face 152, a generally rectangular inner face 156 (see FIG. 2), and a generally flat, trapezoidally-shaped interior face 160 adjoining the inner face 156. In other embodiments, the bow 136 may have a different size and/or shape and/or may be one-piece (i.e., it need not have two bow sections) or may have more than two sections or portions and/or the bow sections 140, 144. In other embodiments, the bow sections 140, 144 may have different sized and/or shaped components than the faces 148, 152, 156, and/or 160. For example, when the bow 136 includes more than two bow sections, each bow section may have different sized and/or shaped components than those explicitly illustrated herein.

The bow 136 is generally movable or reconfigurable between a closed configuration or position and an open configuration of position. In the present embodiments, the bow 136 is movable (e.g., pivotable, rotatable) between the closed configuration shown in FIG. 1 and the open configuration shown in FIG. 2. The first bow section 140 and the second bow section 144 are movable (e.g., pivotable, rotatable, tiltable) relative to one another. When the bow 136 is in the closed configuration, the face 160 of the first bow section 140 abuts or engages the face 160 of the second bow section 144 so as to form the bow 136 and seal the vessel 100. Rubber or other seals may be used to supplement the sealing of the vessel 100. The bow 136 may be locked or latched in the closed configuration via a motorized latching or locking mechanism and/or via manual locking.

To reach the open configuration, in which the first and second bow sections 140, 144 are separated from one another (creating an opening at the front end 116 of the vessel 100), the first bow section 140 is pivotable about the port side 124, particularly a front edge of the port side 124, and the second bow section 144 is pivotable about the starboard side 128, particularly a front edge of the starboard side 128. The first and second bow sections 140, 144 may pivot about the sides 124, 128, respectively, via, for example, a hinge, or other pivot. Each of the first and second bow sections 140, 144 is pivotable via or using an electric servomechanism (not shown), such as an electric servomechanism that provides 500 lbs. of torque. In other embodiments, the first and second bow sections 140, 144 may be pivotable using or via hydraulics (e.g., hydraulics) with limit switches or some other mechanism. The first and second bow sections 140, 144, particularly the faces 160 of the sections 140, 144, may, for example, be pivoted or rotated laterally to an angle of approximately 50 degrees and down to an angle of approximately 5 degrees. In other embodiments, the first and/or second bow sections 140, 144 may be pivoted or rotated differently, such as, for example, to a different angle (e.g., laterally to an angle of approximately 60 degrees, etc.).

The bow 136 may be arranged differently (e.g., connected to a different part of the vessel 100) and/or be movable about different components of the vessel 100. Moreover, the closed configuration and/or open configuration may vary in other embodiments. For example, the bow 136 may be pivotable about the front end 116 of the hull 104 (i.e., pivotable in the forward direction) to an open configuration in which the bow 136 is parallel or substantially parallel (or is even past parallel relative) to the bottom 132 of the hull 104. As another example, the bow 136 may be pivotable about the port side 124 or the starboard side 128 (i.e., pivotable in the port or the starboard direction, respectively) to an open configuration in which the bow 136 is parallel or substantially parallel (or is even past parallel relative) to the sides 124, 128.

As noted above, the vessel 100 includes the deck or deck area 108. The deck or deck area 108 is in the region of or proximate to the bow 136. The deck 108 shown in FIGS. 1-3 fully extends between the forward portion 116 or the bow 136 and the rearward portion 120 or the stern 138 of the hull 104 (i.e., the deck 108 is a continuous deck that spans the entire length of the hull 104). In other embodiments, the deck 108 may only partially extend between the bow 136 and the stern 138 and/or may be formed from more than two pieces. For example, the deck 108 may only extend between the bow 136 and the control station 110. The deck 108 is a one-piece planar or flat deck, but may, in other embodiments, be formed of multiple pieces, such as one or more steps, ramps, and/or raised portions.

As is also noted above, the vessel 100 also includes the ramp mechanism or arrangement 112. The ramp mechanism 112 generally includes a ramp 200, an actuator 204 coupled to the ramp 200, and a drive unit 208 coupled to a part of the vessel 100 and coupled to and configured to drive or move the actuator 204, and, thus, the ramp 200. In other embodiments, the ramp mechanism 112 may include additional, fewer, or different components.

Figure 3:
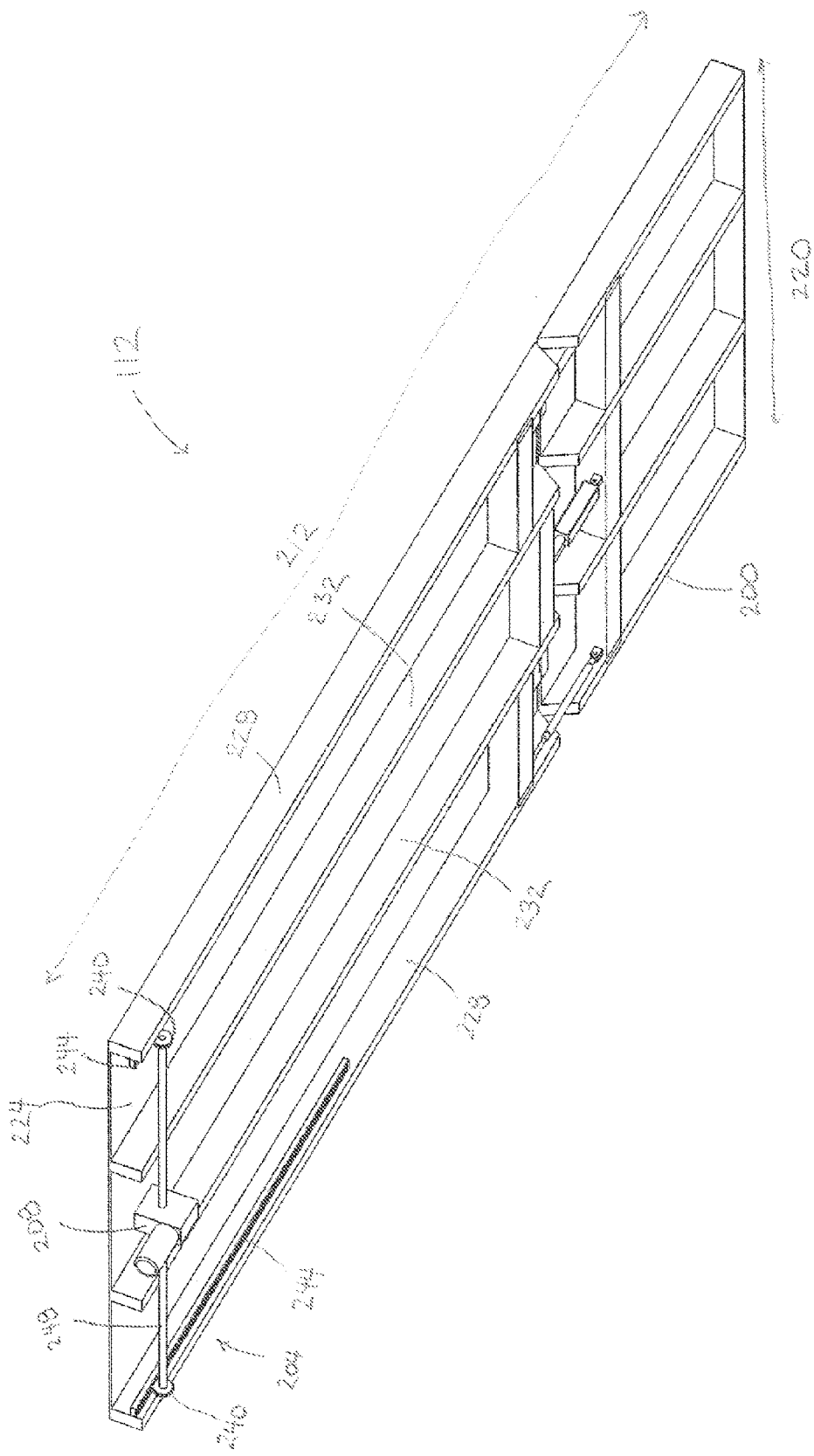
FIG. 3 is a rear perspective view of an exemplary ramp arrangement of the vessel of FIG. 1.
Figure 4:
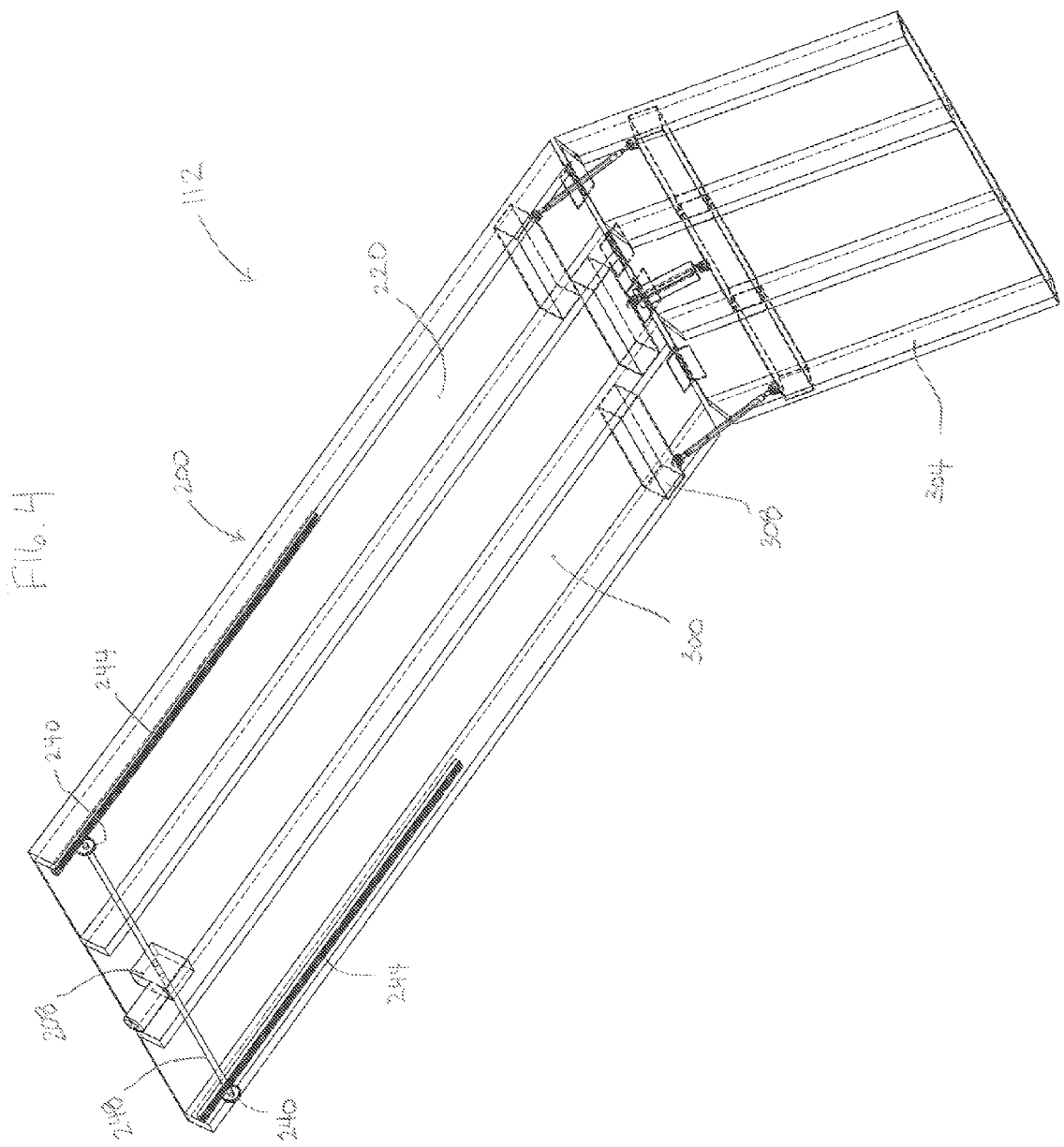
FIG. 4 is a perspective view of the ramp arrangement of FIG. 3 with a second ramp section pivoted relative to a first ramp section.

The ramp 200 is generally located or positioned between the bottom 132 of the hull 104 and the deck 108 in a retracted position. In other words, the ramp 200 is positioned or located under or below the deck 108 and within, inside of, or is encompassed by, the hull 104 when in the retracted position. With reference to FIGS. 3 and 4, which illustrate details of the ramp mechanism or arrangement 112 according to one embodiment, the ramp 200 has a length 212, a width 216 that is approximately equal to the width of the bow 136, a top 220 (see FIG. 4), and an underside 224 (see FIG. 3). The ramp 200 further includes a pair of walls 228 that extend downwardly from edges of the underside 224 (see FIG. 3), and a pair of walls 232 that extend downwardly from the underside 224 between the edges of the top and are positioned or located inward of the walls 228. In other embodiments, the ramp 200 may have additional, fewer, or different components and/or may have a different length 212 and/or width 216 than the illustrated ramp 200.

The actuator 204 is a "rack and pinion" that includes a pair of gears 240 that engage or drive a pair of rails or racks 244. The gears 240 are spur gears, but may be any other type of gears (e.g., a worm gear). One rail 244 is mounted or coupled to an inward facing portion of each wall 228. One or both of the rails 244 may, in other embodiments, be mounted or coupled to a different portion of the ramp 200. The length of the rails 244 corresponds to the distance that the ramp 200 may be extended. The rails 244 may alternatively have a shorter or longer length. In other embodiments, the actuator 204 may be a different type of mechanical actuator, an electric actuator (e.g., a linear electric actuator), a hydraulic actuator, a pneumatic actuator, or any other type of actuator. For example, in one embodiment, the actuator 204 may be a "rack and pinion," but may only include one gear 240 that engages or drives one rail 244 (mounted or coupled, for example, to a middle portion of the underside 224).

Although not explicitly illustrated herein, the drive unit 208 is coupled to a part or portion of the vessel 100. The drive unit 208 may be coupled to a portion of the hull 104 (e.g., the bottom 232), a portion of the deck 108, and/or any other portion of the vessel 100. The drive unit 208 may be directly coupled to the portion of the vessel 100 or may be indirectly coupled (e.g., via a connector or some other component) to the vessel 100. A button, switch, handle, or other activator may be coupled to a portion or part of the vessel 100 and electrically connected to the drive unit 208 to activate or initiate the drive unit 208. The button, switch, handle, or other activator may be located in or on the control station 110 or elsewhere on the vessel 100 (e.g., on the deck 108, on part of the hull 104).

When activated, the drive unit 208 is configured to drive the actuator 204, particularly the gears 240 along or relative to the rails 244, which, in turn, drives or moves the ramp 200. The drive unit 208 is a parallel motor (e.g., a 12 V gear motor), but may be a pump (e.g., hydraulic pump), a generator, a different type of motor, or other drive unit, and/or may be oriented differently relative to the ramp 200 (i.e., not parallel). The drive unit 208 is coupled or connected to the actuator 204, particularly the gears 240, via or using a connecting rod 248. The connecting rod 248 extends through a portion of the drive unit 208 as shown in FIG. 3. In other embodiments, the drive unit 208 may be coupled to the actuator 204 in a different way. For example, the drive unit 208 may be coupled to one gear 240 via the connecting rod 248 and coupled to the other gear 240 via another connecting rod 248. In other embodiments, other transmissions, gearing, belts, pulleys, or arrangements for transferring linear or rotational motion of the drive unit 208 to the ramp 200 may be used.

In the embodiment depicted in FIGS. 3 and 4, the ramp 200 is divided into two sections or portions—a first ramp section or portion 300 and a second ramp section or portion 304 movable relative to the first ramp section 300. The second ramp section 304 is pivotable relative to the first ramp section 300 via a plurality of hinges, but may pivotable via one hinge and/or a different type of hinge mechanism or pivot. The second ramp section 304 is pivotable downward relative to the first ramp section 300, but may alternatively or additionally pivot upward relative to the first ramp section 300. In other embodiments, the ramp 200 need not include any sections or may include more than two sections.

The second ramp section 304 is pivotable relative to the first ramp section 300 using or via an electric servomechanism 308. In other words, the electric servomechanism 308 controls the pivoting of the second ramp section 304 relative to the first ramp section 300. The electric servomechanism 308 provides up to 500 lbs. of torque and includes clutching limits. In other embodiments, a different electric servomechanism (e.g., one that provides a different amount of torque), a hydraulic system, or some other type of position controller may be used.

Figure 5:
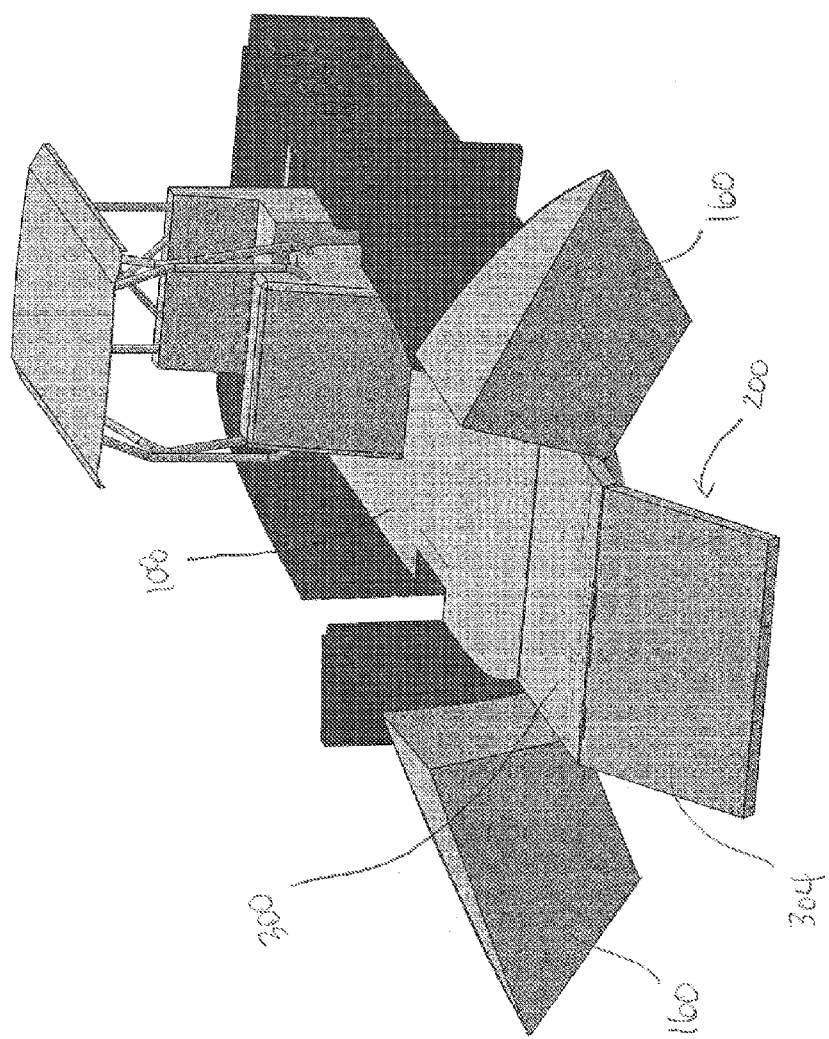
FIG. 5 is a perspective view of the vessel of FIG. 1 with a ramp moved to an extended position.

Reference is again made to FIG. 1, which shows the bow 136 in the closed configuration. When the bow 136 is in the closed configuration, the ramp 200 is in the retracted position and is hidden or concealed from view by the deck 108 and the bottom 132 of the hull 104 (i.e., the ramp 200 is not visible). When, however, the bow 136 is moved from the closed configuration to the open configuration, which is shown in FIG. 2, a front edge of the ramp 200, which is still in the retracted position, is visible between the bottom 132 of the hull 104 and the deck 108. In other embodiments, the ramp 200 may be maintained behind a door or seal and, thus, not visible. With the bow 136 in the open configuration, the ramp 200 is adjustable, slidable, extendible, or otherwise movable from the retracted position to an extended position. In the present embodiments, the ramp 200 is horizontally slidable (e.g., parallel to the length of the hull 104) forward or outward from the retracted position to the extended position, but the ramp 200 may be slidable or otherwise movable in a different manner. FIG. 5 shows the ramp 200 in the extended position, in which the ramp extends forward or horizontally outward from the front end 116 of the hull 104. In other words, when the ramp 200 is in the extended position, it is no longer completely under the deck 108 or within or encompassed by the hull 104. When the ramp 200 is fully extended, the front edge of the ramp 200 is positioned or located forward of the bow sections 140, 144, and the second ramp section 304 is outside or extends outward from the front end 116 of the hull 104 (i.e., it is no longer under the deck 108 or within the hull 104).

The drive unit 208 is generally configured to move the ramp 200 from the retracted position (FIG. 2) to the extended position (FIG. 5). More specifically, the drive unit 208, when activated or initiated (by, for example, personnel on or associated with the vessel 100), drives or moves the gears 240 horizontally rearward (toward the rear end 120 of the hull 104) along the rails 244. As the gears 240 are driven horizontally rearward along the rails 244, the ramp 200 is moved or driven horizontally forward (toward and past the front end 116 of the hull 104). The drive unit 208 drives the gears 240 horizontally rearward until the end of the rails 244, at which point the ramp 200 has been fully or completely moved or driven horizontally forward or outward (relative to the hull 104) to the extended position. When the gears 240 are at their horizontally rearward most position and the ramp 200 has been fully moved forward, one or more limit switches, sensors, or other stops may be used to control (e.g., shut off) the drive unit 208.

The ramp 200 need not, however, always be moved or driven forward to the extended position shown in FIG. 5. In some cases, it may be desirable to move or drive the ramp 200 to a partially extended position between the retracted position shown in FIG. 2 and the extended position shown in FIG. 5. For example, the ramp 200 may be moved to a position that is halfway between the retracted position and the extended position. In these cases, the personnel on or associated with the vessel 100 may activate or initiate the drive unit 208, which drives or moves the gears 240 horizontally rearward along the rail 244, and the ramp 200 horizontally forward or outward, until the ramp 200 reaches the desired position (between the retracted position and the extended position), at which time the personnel ceases to activate or initiate the drive unit 208 (e.g., releases the button, switch, etc.). In other cases, the ramp 200 may be partially extended or moved according to one or more pre-determined and pre-programmed positions or locations (e.g., ½ extended, ¾ extended, etc.). For example, the vessel personnel may choose to extend the ramp 200 to one of these pre-determined and pre-programmed positions or locations, after which the drive unit 208 drives or moves the gears 240 horizontally rearward along the rail 244, and the ramp 200 horizontally forward or outward, until the ramp 200 reaches the selected position between the retracted position and the extended position, at which point the one or more sensors, limiters, or stops may shut off the drive unit 208.

When the ramp 200 is at least partially extended, the vessel 100 may be boarded and/or de-boarded quickly and efficiently. The performance of emergency operations (e.g., patrol, search, rescue, and/or firefighting operations) may be facilitated. For example, rapid entry or exit to or from the vessel 100 using the ramp is provided. The vessel 100 may be positioned adjacent a ground surface, such as a shore of a beach, allowing use of the ramp to board or de-board vessel personnel (e.g., emergency personnel) and/or equipment.

When the ramp 200 is at least partially extended such that at least the second ramp section 304 clears (i.e., is past or forward of) the front end 116 of the hull 104, the second ramp section 304 is pivotable, using the electric servomechanism 308, relative to the first ramp section 300 as described above. One or more limit switches, sensors, or stops may be used to control (e.g., shut off) the servomechanism 308 in order to control how much the second ramp section 304 pivots relative to the first ramp section 300. For example, the one or more limit switches, sensors, or stops may shut off the servomechanism 308 when the second ramp section 304 has been pivoted to the position, relative to the first ramp section 300, desired by the personnel on or associated with the vessel 100. In another example, the one or more limit switches, sensors, or stops may shut off the servomechanism 308 when the second ramp section 304 reaches or touches the ground surface or when the second ramp section 304 reaches a pre-determined or pre-programmed position (e.g., is at a 20 degree angle) relative to the first ramp section 300. In any event, the performance of emergency operations may be facilitated. For example, rapid entry or exit to or from the vessel 100 using the pivoted ramp is provided. The ramp 200, or at least a portion thereof, may be lowered to the level of the ground surface to permit quick and efficient boarding or de-boarding of personnel and/or equipment.

The drive unit 208 is also generally configured to move the ramp 200 from the extended position back to the retracted position. This is accomplished by activating the drive unit 208, which drives or moves the gears 240 horizontally forward (toward the front end 116 of the hull 104) along the rails 244. As the gears 240 are driven horizontally forward along the rails 244, the ramp 200 is moved or driven horizontally rearward (toward the rear end 120 of the hull 104). The drive unit 208 drives the gears 240 horizontally forward until the end of the rails 244, at which point the ramp 200 has been fully or completely moved or driven back or rearward to the retracted position. One or more limiters, sensors, and/or stops may be used to control (e.g., shut off) the drive unit 208 (e.g., when the ramp 200 reaches the retracted position or a pre-determined position).

In other embodiments, the process for extending and/or pivoting a portion of the ramp 200 may vary and yet still fall within the scope of the present embodiments. For example, different components may be used to extend and/or retract the ramp 200. Likewise, different components may be used to move or adjust portions of the ramp 200 relative to other portions.

By providing a vessel that includes a hull (e.g., V-shaped hull) with a curved, reconfigurable bow, and an adjustable ramp, as described herein, the present embodiments provide a vessel that is capable of handling heavy water and is configured to facilitate the quick and efficient performance of emergency operations (e.g., patrol, search, rescue, and/or firefighting operations).

Figure 6:
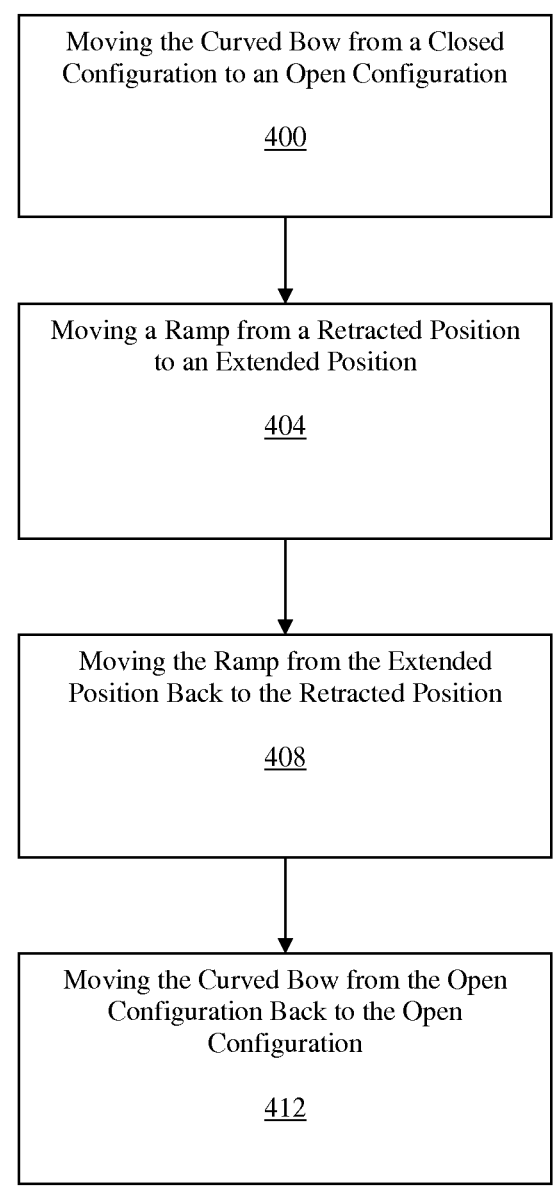
FIG. 6 is a flow chart diagram of one embodiment of a method for operating a vessel with an extendible ramp.

FIG. 6 shows a flow chart depicting a method of providing speedy access to land via a vessel (e.g., a vessel configured to operate in heavy water). The operation may be implemented using the vessel 100 described above. In other embodiments, a different vessel, craft, or boat may be used. The method is implemented in the order shown, but may be implemented in or according to any number of different orders. Additional, different, or fewer acts may be provided. For example, the bow may be moved between the closed configuration and the open configuration any number of times. As another example, the ramp may be moved between the retracted position and the extended position any number of times.

The vessel includes a hull (e.g., the hull 104) with a front end (e.g., the front end 116), a rear end (e.g., the rear end 120), a pair of sides (e.g., the sides 124, 128) between the front end and the rear end, a bottom (e.g., the bottom 132), and a curved bow (e.g., the bow 136) at the front end.

The operation or method includes moving the curved bow from a closed configuration to an open configuration (act 400). Moving the curved bow from the closed configuration to the open configuration may include pivoting a first bow section (e.g., the first bow section 140) of the curved bow about a first side (e.g., the side 124) of the pair of sides and pivoting a second bow section (e.g., the second bow section 144) of the curved bow about a second side (e.g., the side 128) of the pair of sides.

The operation or method also includes moving a ramp (e.g., the ramp 200) from a retracted position to an extended position when the curved bow is in the open configuration (act 404). In the retracted position, the ramp is located between the hull and a deck (e.g., the deck 108) in the region of the curved bow. In the extended position, the ramp extends from the front end of the hull. Moving the ramp from the retracted position to the extended position may include moving or sliding the ramp in a horizontal direction (e.g., parallel to a length of the hull) from the retracted position to the extended position. When the ramp is in the extended position, a second ramp section (e.g., the second ramp section 304) of the ramp may be pivoted relative to a first ramp section (e.g., the first ramp section 300) of the ramp using a servomechanism (e.g., the servomechanism 308).

The operation or method further includes moving the ramp from the extended position back to the retracted position when the curved bow is in the open configuration (act 408) and moving the curved bow from the open configuration back to the closed configuration when the ramp is in the retracted position (act 412).

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A water vessel comprising:
a hull having a front end, an aft end, a starboard side, a port side, a bottom, a curved bow at the front end, and a stern at the aft end, the curved bow being movable between a closed configuration and an open configuration;
a deck in the region of the curved bow; and
a ramp located between the hull and the deck, wherein the ramp comprises a first ramp portion and a second ramp portion, both portions stored adjacent in the same plane parallel to the deck in a retracted position, the ramp moveable outward from under the deck while being parallel with the deck, when the curved bow is in the open configuration, to an extended position in which the ramp extends outward from the front end of the hull, wherein the second ramp portion is pivotable relative to the first ramp portion, both the first and second ramp portions extending from the front end of the hull and the first ramp portion remaining parallel to the deck and the second ramp dropping at an angle downward relative to the first ramp portion.

2. The water vessel of claim 1, wherein the hull generally has a V-shape.

3. The water vessel of claim 1, wherein the curved bow is split into a first bow portion and a second bow portion, the first bow portion and the second bow portion are pivotable relative to one another, the first bow portion being pivotable about the port side and the second bow portion being pivotable about the starboard side.

4. The water vessel of claim 1, wherein the ramp is slidable parallel to the deck in a horizontal direction to the extended position.

5. The water vessel of claim 1, wherein when the ramp is in the retracted position, the ramp is substantially enclosed between the hull and the deck.

6. The water vessel of claim 1, wherein the ramp is movable to the extended position via a motor.

7. The water vessel of claim 1, wherein the ramp is movable to the extended position via a motor that drives a gear along a rail on an underside of the deck.

8. A water vessel comprising:
a hull having a front end, a rear end, a first side and a second side wherein the first side and the second side connect the front end and the rear end, a bottom, a bow at the front end, and a stern at the rear end, the bow being movable between a closed configuration and an open configuration;
a deck extending between the bow and the stern;
a ramp located between the hull and the deck, wherein the ramp includes a first ramp section and a second ramp section, where both the first and second ramp sections store in one plane adjacent to each other and both the first and second ramp sections store parallel to the deck when in a retracted position; and
a motor coupled to the ramp and configured, when the bow is in the open configuration, to drive the ramp to an extended position in which the ramp extends forward from the front end of the hull, the second ramp portion rotatably movable relative to the first ramp section when the ramp is in the extended position, wherein the first ramp section remains parallel to the deck and the second ramp drops at an angle downward relative to the first ramp section.

9. The water vessel of claim 8, wherein the bow is split into a first portion and a second bow portion, the first portion being pivotable to the first side and the second bow portion being pivotable relative to the second side.

10. The water vessel of claim 8, wherein when the bow is in the closed configuration and the ramp is in the retracted position enclosed between the lowest deck and the hull.

11. The water vessel of claim 8, further comprising a rack and a pinion in combination with the motor and to the ramp, wherein the motor is configured, when the bow is in the open configuration, to drive the ramp to the extended position via the rack and pinion arrangement.

12. The water vessel of claim 8, wherein the ramp includes a first ramp section and a second ramp section pivotable downward relative to the first ramp section when the ramp is in the extended position.

13. The water vessel of claim 12, wherein the second ramp section is pivotable using a servomechanism.

14. The water vessel of claim 8, further comprising a pair of rails mounted to the underside of the ramp, wherein the motor is coupled to a pair of gears engaging the pair of rails and is configured, when the bow is in the open configuration, to drive the pair of gears along the pair of rails to move the ramp to the extended position.

15. A method of operating providing access to land using a water vessel comprising a hull having a front end, a rear end, a pair of sides between the front end and the rear end, a bottom, and a curved bow at the front end, the method comprising:
   moving the curved bow from a closed configuration to an open configuration;
   sliding a ramp parallel to a deck, wherein the ramp includes a first ramp section and a second ramp section, when the curved bow is in the open configuration, from a retracted position in which the ramp is located between the hull and the deck, both portions of the ramp stored in a same plane parallel to the deck, in the region of the curved bow to an extended position in which the ramp extends from the front end of the hull, when the ramp is in the extended position, pivoting the second ramp section of the ramp relative to the first ramp section of the ramp using a servomechanism, wherein the first ramp section remains parallel to the deck and the second ramp pivots to a downward angle relative to the first ramp section;
   sliding the ramp, when the curved bow is in the open configuration, from the extended position back to the retracted position; and
   moving, when the ramp is in the retracted position, the curved bow from the open configuration back to the closed configuration.

16. The method of claim 15, wherein sliding the ramp from the retracted position to the extended position comprises sliding the ramp in a direction parallel to the hull from the retracted position to the extended position.

17. The method of claim 15, wherein moving the curved bow from the closed configuration to the open configuration comprises pivoting a first bow section of the curved bow about a first side of the pair of sides and pivoting a second bow section of the curved bow about a second side of the pair of sides.

* * * * *